Oct. 30, 1928.

F. B. BELL ET AL 1,689,662

CUSHIONING OR SHOCK ABSORBING DEVICE

Filed April 21, 1927

Inventors:
F. B. Bell & O. R. Wikander,
Paul P. Schilling,
Attorney.

Patented Oct. 30, 1928.

1,689,662

UNITED STATES PATENT OFFICE.

FRANK B. BELL AND OSCAR R. WIKANDER, OF PITTSBURGH, PENNSYLVANIA, ASSIGNORS TO EDGEWATER STEEL COMPANY, OF PITTSBURGH, PENNSYLVANIA.

CUSHIONING OR SHOCK-ABSORBING DEVICE.

Application filed April 21, 1927. Serial No. 185,557.

This invention relates to cushioning or shock absorbing devices, and has special reference to cushioning or shock absorbing devices of that type employing concentrically arranged ring springs having conical or inclined engaging surfaces and which are subject to deformation under tensile and compression stresses when axial pressure is applied thereto so as to give a spring reaction with a frictional resistance which increases the spring reaction during compression and which exerts a retarding action during recoil upon the springs being relieved from compression.

It is desirable in many uses of such a cushioning or shock absorbing device to transmit the force to be cushioned in an easy and gradually increasing manner to a sturdy ring spring structure having great energy-absorbing capacity and capable of sustaining and cushioning pressure forces, shocks and jars of more or less great intensity. The use, in conjunction with a ring spring, of ordinary coil precessional springs for preliminarily buffing the force of compression and gradually transmitting the same to a ring spring structure has been suggested, but springs of coil type are faulty and inefficient in action for this purpose, as not having sufficient absorbing energy within the available space, and are open also to the objection that they set or break easily.

One object of our invention is to provide a cushioning or shock absorbing device which combines relatively soft and stiff precessional and backing springs, both of ring spring type, whereby a highly efficient and desirable soft starting and gradually increasing energy-absorbing action within any desired limits may be obtained while securing and retaining all the advantages of a strictly ring spring structure throughout.

Another object of the invention is to provide a cushioning or shock absorbing device having an enclosing casing for the springs which holds them from relative displacement and permits of their ready and convenient installation, and which also furnishes a leak-proof enclosure to allow the springs to operate in oil or other lubricant, if desired, and prevents the entrance of dust or other foreign matter, while also adapted to serve other functions and afford other advantages under various service conditions.

The invention consists of the features of construction, combination and arrangement of parts, hereinafter fully described and claimed, reference being had to the accompanying drawings, in which:

Figure 1:
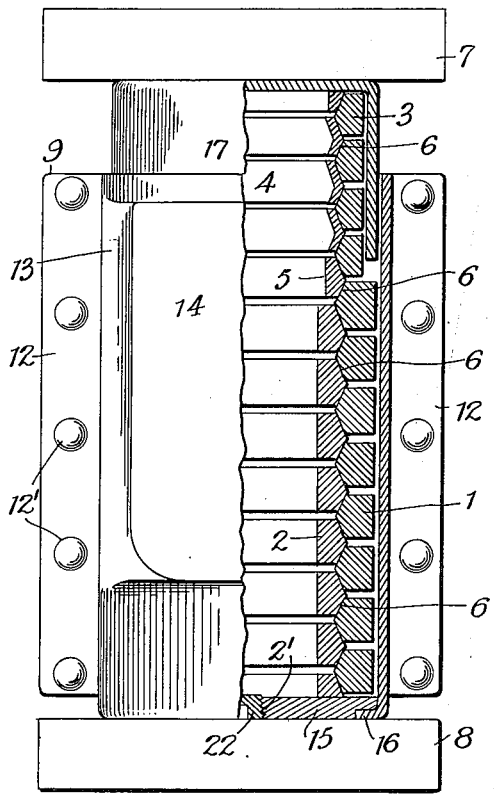
Figure 1 is a view, partly in elevation and partly in longitudinal section, of a cushioning or shock-absorbing device embodying the invention, showing the springs in normal or expaded condition.
Figure 2:
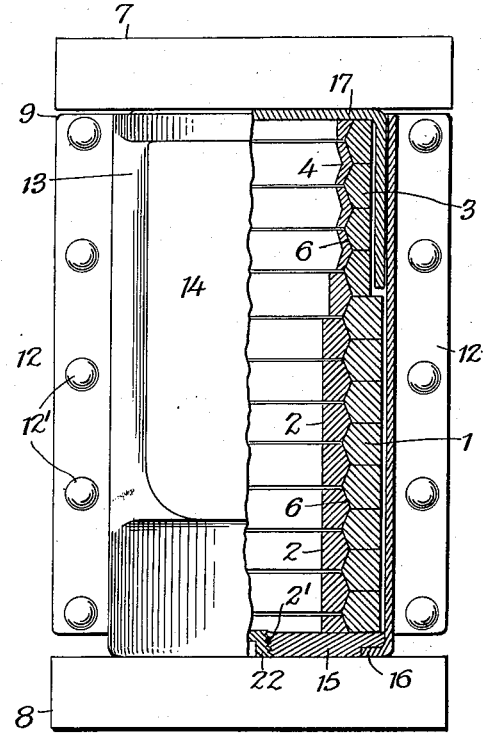
Figure 2 is a similar view, showing the springs in fully compressed condition.
Figure 3:
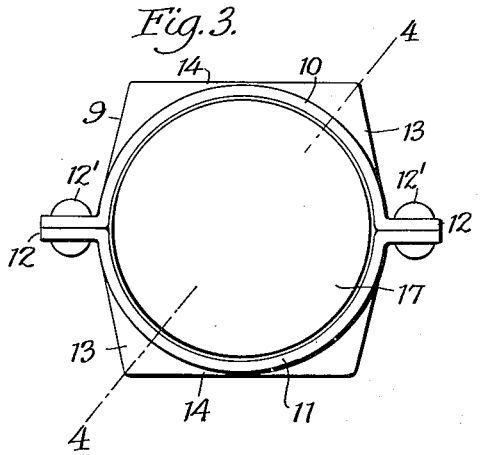
Figure 3 is an end elevation of the device.
Figure 4:
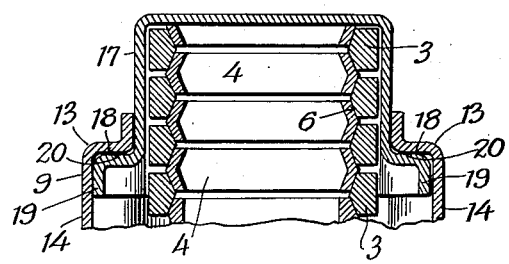
Figure 4 is a section through one end of the device, taken on line 4—4 of Figure 3.

Referring now more particularly to the drawings, 1 and 2 designate the outer and inner rings of a backing spring unit or spring couple, and 3 and 4 designate the outer and inner rings of a precessional spring unit or spring couple, in conjunction with which units or spring couples a single intermediate or transmission ring spring member 5 is prefereably employed. These rings are provided with inclined or conical friction faces 6 of the same pitch diameter and the same angularity. The rings 3 and 4 of the precessional unit serve to take up the initial pressure or shock of impact and to transmit the same to the rings 1 and 2 of the backing unit which is thereby gradually compressed and sustains and cushions the bulk of the pressure or shock. The spring 5 acts as an intermediary cushioning medium between the juxtaposed rings 1 and 3 of the two units to maintain a continuity of spring action and to effect a pressure transfer motion from one to the other in an easy and regulated manner.

The springs 1 are relatively heavier or of greater cross-section than the springs 2, which are relatively heavier or of greater cross-section than the springs 3, which in turn are relatively heavier and of greater cross-section than the springs 4, while the spring 5 is of mean character as compared with springs 3 and 4, being lighter and of less cross-section than springs 3 and heavier and of greater cross-section than springs 4. By the use of the relative terms "heavier" and "lighter" is meant relative degrees of strength, i. e., elasticity, or degrees of resistance to compression. The rings 4, as shown, are of small section as compared with the other rings, or very light, so that during the travel of the elements of the precessional unit a very soft starting motion will take place, due to the initial minimum resistivity of the rings 4, followed by a gradual and progressively increasing resistance as such rings are compressed within the rings 3 and the latter are brought together, until finally force is transmitted through the rings 3 to the rings 5, 1, 2, the rings 3 being sufficiently heavy to transmit the larger force required to close the main or backing spring 1, 2. It will be observed that the rings of the series 3, 4 will progressively come into play until the maximum resistance of the precessional spring is reached, while a part of the force of this spring is being transmitted to spring 5, and that thereupon the springs 3, 4, 5 will act as a unit to transmit the force to the springs 1, 2 which will gradually and progressively come into play to furnish the final strong main or backing resistance to cushion or absorb the bulk of the force or shock. Thus an easy cushioning action of even very great forces may be obtained without jolts or jars or undue strain upon the springs or other parts of the cushioning device or upon the vehicle or other body on which such device is used. By the construction described also the use of coiled precessional springs is avoided and all the desirable advantages of a strictly ring spring structure throughout obtained.

The cushioning device is arranged between abutments 7 and 8, either one or both of which may constitute followers, and the springs of the device work within a longitudinally split enclosing casing 9 comprising two counterpart halves or sections 10 and 11 having radially projecting abutment flanges 12 at their meeting edges united by bolts or rivets 12'. These flanges are disposed at diametrically opposite sides of the casing and the diametrically opposed sides of the casing at right angles to the flanged sides are provided with outwardly bulged portions 13 provided with flattened faces 14. The sectional construction of the casing permits ready initial assemblage of the parts and the flanges and flattened sides provide means for guiding the device in a guide chamber or pocket for a draft gear or the like and to prevent the device from turning on its axis. The casing is closed at its bottom or rear end by a head 15, which may be held in position by a flanged part 16 of the casing or otherwise, and this head serves as a supporting base for the lower or rear end of the backing spring unit. A cup-shaped plunger 17 is slidably fitted in the opposite or forward end of the casing and encloses the rings of the precessional unit and holds the same assembled and permits of the expansion of such rings beyond such end of the casing without relative displacement. The formation of the bulged portions 13 provides abutment shoulders 18 at the upper or front end of the casing, and the plunger is provided with a guide flange or flanges 19 to guide it in its movements in the casing, said flange presenting a stop flange or flanges 20 for engagement with said abutment shoulder or shoulders 18 to limit the outward movement of the plunger and expansion of the springs 3 and 4. The head 15 may be provided with an opening 21 normally closed by a plug 22. Through this opening oil or other lubricant may be introduced for keeping the surfaces of the springs lubricated and to protect them from rust.

By providing a cushioning device having backing and precessional springs both of which are of ring spring type compactness is secured for any given cushioning capacity, as well as maximum reliability and efficiency of action.

Having thus fully described our invention, we claim:—

1. A cushioning or shock absorbing device comprising a stiff main backing spring of ring spring type, and a relatively weaker precessional spring or ring spring type frictionally coupled to the backing spring for initially receiving and transmitting a force to said backing spring.

2. A cushioning or shock absorbing device comprising a main backing spring of ring spring type embodying outer and inner rings having inclined contact faces, and a precessional spring of ring spring type and embodying outer and inner rings having inclined contact faces, and an intermediate ring having inclined contact faces engaging the contact faces of juxtaposed rings of the backing and precessional springs, the rings of the springs and the intermediate ring being of like pitch diameter and having inclined faces of the same degree of angularity.

3. A cushioning or shock absorbing device comprising a backing spring of ring spring type, a precessional spring of ring spring type, and a transmission spring between and in direct contact with adjacent rings of said backing and precessional springs.

4. A cushioning or shock absorbing device comprising a backing spring formed of outer and inner series of ring springs having inclined contact faces, a precessional spring formed of outer and inner series of ring springs having inclined contact faces, and a transmission ring spring having inclined contact faces engaging adjacent inclined contact faces of the juxtaposed outer rings of the backing and precessional springs.

5. A cushioning or shock absorbing device comprising a backing spring consisting of outer and inner series of relatively strong and weak ring springs having inclined contact faces, and a precessional spring consisting of outer and inner series of relatively strong and weak ring springs having inclined contact faces, the rings of the precessional spring being relatively weaker than the rings of the backing spring.

6. A cushioning or shock absorbing device comprising a backing spring consisting of outer and inner series of relatively strong and weak ring springs having inclined contact faces, a precessional spring consisting of outer and inner series of relatively strong and weak ring springs having inclined contact faces, the rings of the precessional spring being relatively weaker than the rings of the backing spring, and an intermediate transmission ring spring having inclined contact faces engaging adjacent inclined contact faces of the juxtaposed outer rings of the backing and precessional springs.

7. A cushioning or shock absorbing device comprising a casing, a backing spring of ring spring type in said casing, a cup-shaped plunger at one end of the casing, and a precessional spring of ring spring type disposed between the backing spring and the plunger and enclosed by the latter.

8. A cushioning or shock absorbing device comprising a backing spring of ring spring type, a precessional spring of ring spring type, a sectional casing for the springs, and means for holding the casing sections united.

9. A cushioning or shock absorbing device comprising a backing spring of ring spring type, a precessional spring of ring spring type, a longitudinally split casing for the springs, and means for holding the casing sections united.

10. A cushioning or shock absorbing device comprising a sectional casing, a backing spring of ring spring type in said casing, a cup-shaped plunger at one end of the casing, a precessional spring of ring spring type disposed between the backing spring and the plunger and enclosed by the latter, and means for holding the sections of the casing united.

11. A cushioning or shock absorbing device comprising sets of ring springs arranged in tandem order and in continuous frictional engagement for transmission of pressure from one set to the other, one of the springs being relatively weaker than the other.

12. A cushioning or shock absorbing device comprising front and rear sets of coaxially arranged ring springs in continuous frictional engagement, the front set of springs being relatively weaker than the rear set of springs.

13. A cushioning or shock absorbing device comprising sets of friction springs of relatively different strengths arranged in tandem order and in frictional engagement throughout the sets.

14. A cushioning or shock absorbing device comprising front and rear sets of friction rings of different relative strengths, each set consisting of inner rings and outer rings having coacting inclined surfaces, and a frictional ring having inclined surfaces and engaging similar juxtaposed rings of the sets.

15. A cushioning or shock absorbing device comprising front and rear sets of friction rings of different relative strengths, each set consisting of inner rings and outer rings having coacting inclined surfaces, and a frictional ring having inclined surfaces and engaging juxtaposed outer rings of the sets.

16. A continuous ring spring cushioning or shock absorbing device comprising sets of springs of relatively increasing shock absorbing capacities arranged in tandem order and in frictional engagement from ring to ring throughout the sets.

In testimony whereof we affix our signatures.

FRANK B. BELL.
OSCAR R. WIKANDER.